US009516356B2

(12) United States Patent
Hamzeh

(10) Patent No.: US 9,516,356 B2
(45) Date of Patent: Dec. 6, 2016

(54) PARALLEL SCHEDULING OF MULTILAYERED MEDIA

(71) Applicant: Cable Television Laboratories, Inc., Louisville, CO (US)

(72) Inventor: Belal Hamzeh, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/558,995

(22) Filed: Dec. 3, 2014

(65) Prior Publication Data
US 2015/0163524 A1 Jun. 11, 2015

Related U.S. Application Data

(60) Provisional application No. 61/912,733, filed on Dec. 6, 2013.

(51) Int. Cl.
| H04N 21/63 | (2011.01) |
| H04N 21/236 | (2011.01) |
| H04N 21/239 | (2011.01) |
| H04W 4/18 | (2009.01) |
| H04W 28/02 | (2009.01) |
| H04N 21/2343 | (2011.01) |
| H04L 12/851 | (2013.01) |
| H04L 12/707 | (2013.01) |
| H04W 88/10 | (2009.01) |

(52) U.S. Cl.
CPC ............ *H04N 21/236* (2013.01); *H04L 45/24* (2013.01); *H04L 47/2433* (2013.01); *H04L 47/2483* (2013.01); *H04N 21/239* (2013.01); *H04N 21/23611* (2013.01); *H04N 21/234327* (2013.01); *H04N 21/631* (2013.01); *H04W 4/18* (2013.01); *H04W 28/0215* (2013.01); *H04W 88/10* (2013.01)

(58) Field of Classification Search
CPC ................ H04N 21/631; H04N 21/236; H04N 21/23611
See application file for complete search history.

(56) References Cited

U.S. PATENT DOCUMENTS

| 5,481,312 | A | * | 1/1996 | Cash | .................... | H04L 12/6418 |
| | | | | | | 348/465 |
| 6,798,838 | B1 | * | 9/2004 | Ngo | ...................... | H04L 1/0003 |
| | | | | | | 348/E5.003 |
| 2004/0016000 | A1 | * | 1/2004 | Zhang | ................ | H04N 7/17354 |
| | | | | | | 725/143 |
| 2004/0261113 | A1 | * | 12/2004 | Paul | ................. | H04N 21/23432 |
| | | | | | | 725/90 |
| 2005/0243835 | A1 | * | 11/2005 | Sharma | ............... | H04L 12/2874 |
| | | | | | | 370/395.42 |
| 2008/0158339 | A1 | * | 7/2008 | Civanlar | ................ | H04N 7/152 |
| | | | | | | 348/14.09 |

(Continued)

*Primary Examiner* — Robert Hance
(74) *Attorney, Agent, or Firm* — Great Lakes Intellectual Property, PLLC.

(57) ABSTRACT

Multi-link transportation of media, video and other data of the type having multiple layers, streams and/or encodings is contemplated. The multi-link transportation may be facilitated with a scheduler configured to schedule the various layers, streams, encodings, etc. for transportation over selectable communication links, such as based on reliability, capacity and/or other operating characteristics.

19 Claims, 2 Drawing Sheets

(56) References Cited

U.S. PATENT DOCUMENTS

| | | | |
|---|---|---|---|
| 2010/0260254 A1* | 10/2010 | Kimmich | H04N 21/631 |
| | | | 375/240.01 |
| 2010/0287296 A1* | 11/2010 | Riggert | H04L 69/14 |
| | | | 709/231 |
| 2011/0083156 A1* | 4/2011 | Martinez | H04N 7/17318 |
| | | | 725/118 |
| 2013/0239150 A1* | 9/2013 | Chen | H04L 5/0044 |
| | | | 725/62 |
| 2013/0268985 A1* | 10/2013 | Kim | H04N 21/2385 |
| | | | 725/109 |
| 2014/0002598 A1* | 1/2014 | Kim | H04N 19/597 |
| | | | 348/43 |
| 2014/0201329 A1* | 7/2014 | Himayat | H04L 12/6418 |
| | | | 709/219 |
| 2014/0313989 A1* | 10/2014 | Doken | H04L 65/605 |
| | | | 370/329 |

\* cited by examiner

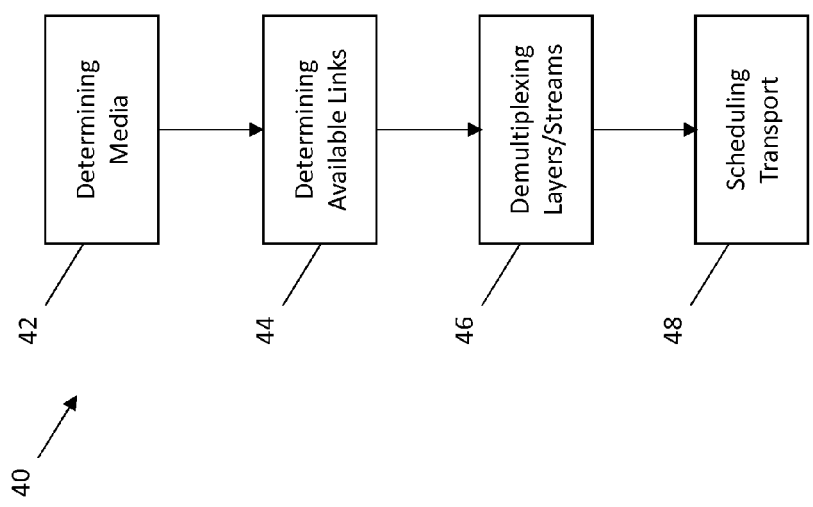

PARALLEL SCHEDULING OF MULTILAYERED MEDIA

CROSS-REFERENCE TO RELATED APPLICATIONS

This application claims the benefit of U.S. provisional Application No. 61/912,733 filed Dec. 6, 2013 the disclosure of which is incorporated in its entirety by reference herein.

TECHNICAL FIELD

The present invention relates to facilitating transportation of media, video and other data of the type having multiple layers, streams and/or encodings, such as but not necessary limited to facilitating parallel transport scheduling of such multilayered media across multiple communication links.

BACKGROUND

Any number of techniques, protocols, specifications and the like exist to facilitate generating media in an electronically transmissible form. The electronically transmissible media may be generated by encoding, processing or otherwise manipulating an original content into an electronic form suitable for entirely or partially representing the original content. In the case of video, such as that formatted in accordance with Moving Picture Experts Group (MPEG) version 2 (MPEG-2) or version 4 (MPEG-4), the disclosures of which are hereby incorporated by reference in their entireties, the original content may be encoded to into a plurality of layers/streams to generate the media, which may be referred to as multilayered media. MPEG encoders may be configured to produce multilayered media by encoding the original content into intra-coded pictures (I-frames), predicted pictures (P-frames) and bi-predictive pictures (B-frames). One non-limiting aspect of the present invention contemplates facilitating transport of multilayered media, video and other data of the type having multiple layers, streams and/or encodings.

BRIEF DESCRIPTION OF THE DRAWINGS

FIG. 2 illustrates a flowchart of a method for parallel scheduling of multilayered media in accordance with one non-limiting aspect of the present invention.

DETAILED DESCRIPTION

Figure 1:
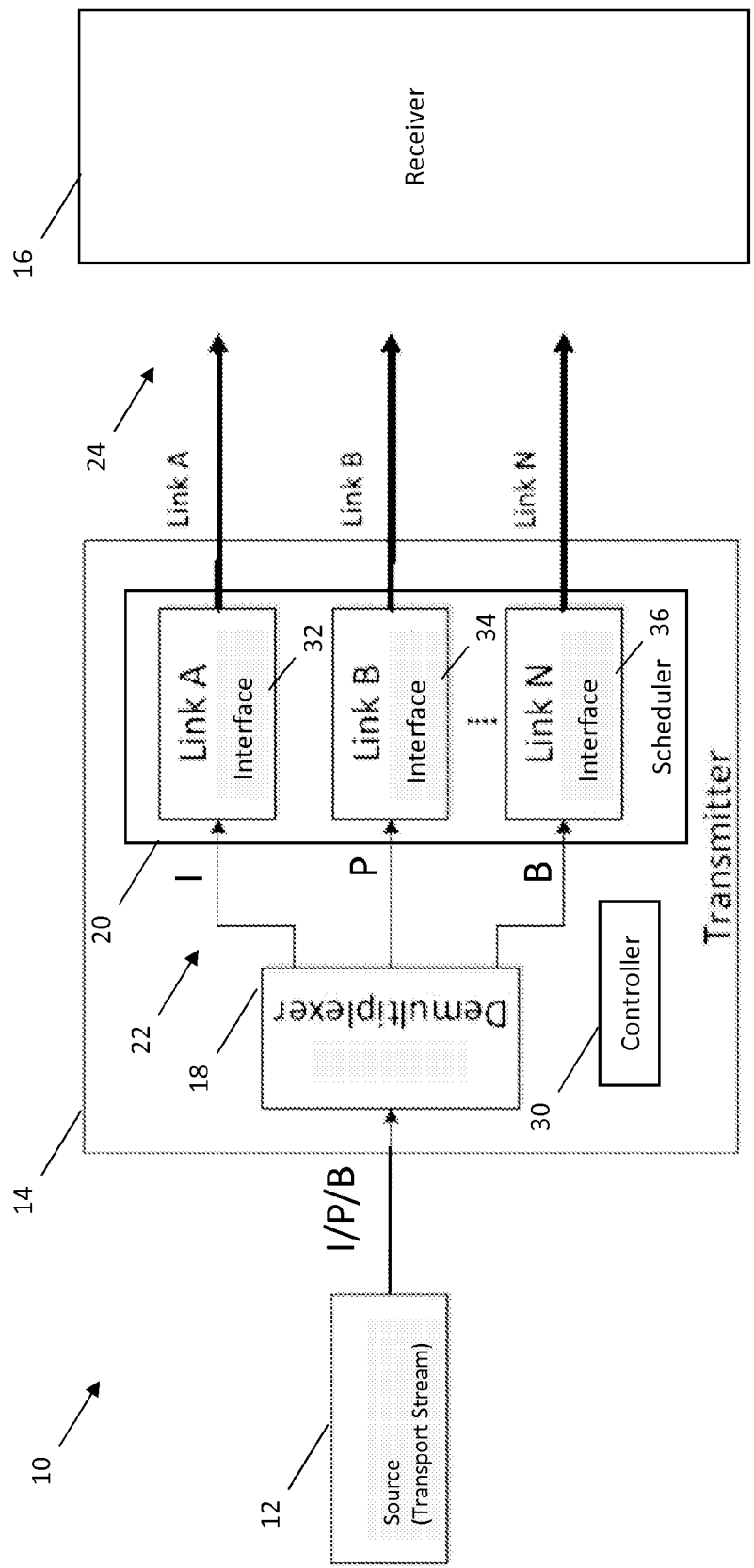
FIG. 1 illustrates a system for transporting multilayered media in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 for transporting multilayered media in accordance with one non-limiting aspect of the present invention. The system 10 may be configured to facilitate transporting virtually any type of media, including video, audio, pictures, images, etc. and is for exemplary non-limiting purposes predominately described with respect to facilitating transport of video encoded according to MPEG and delivered within a transport stream from a source 12. The MPEG encoded video may include a plurality of layers to facilitate representing the original content as a plurality of video frames, optionally with a layer for each type of encoding, i.e. a layer for the I-frames, a layer for the P-frames and a layer for the B-frames. The I-frames may correspond with the fundamental frames for any image and come in at a lower rate (frequency), the P-frames may be generated at a higher rate than the I-frames and may be additive to the I-frames to add more resolution and similarly the B-frames may be generated at a higher rate than the P-frames to add more resolution A transmitter 14 may be configured in accordance with the present invention to process the transport stream, or more particularly one or more of the layers therein, for multi-link transport to a receiver 16.

The transmitter 14 may include a demultiplexor 18 to demultiplex or otherwise recover one or more layers/streams included within the transport stream for output to a scheduler 20, which for exemplary purposes is shown to correspond with recovery of a plurality of feeds 22. The scheduler 16 may be configured to schedule the plurality of feeds 22 for transport over a corresponding one or more of a plurality of links 24. The transmitter 14 may include a controller 30 configured to facilitate controlling the demultiplexor 18 and the scheduler 20 and to otherwise facilitate the operations contemplated herein, such as in accordance with a plurality of non-transitory instructions included within a computer-readable medium associated with the transmitter 14. One non-limiting aspect of the present invention contemplates the controller 30 being operable to assess operating conditions or characteristics of the plurality of links 24 and to schedule transport of the feeds 22 (I-frames/layer, P-frames/layer, B-frames/layer) over the links 24 as a function thereof. The capability to selectively manage the links 24 used to subsequently transport the video may be beneficial in enabling a service provider or other entity operating the transmitter 14 to maximize capacity, reliability, throughput and/or quality of service (QoS).

The transport scheduling contemplated by one non-limiting aspect of the present invention may be performed in a parallel manner whereby different portions of the transport stream may be simultaneously transported over two or more of the links 24. The parallel processing may take many forms and is illustrated for non-limiting purposes to correspond with an exemplary scenario where the I-frames, P-frames and B-frames, or corresponding portion/layer/stream 22 of the transport stream, are respectively transported over a first link, a second link and a third link of the plurality of links 24. The links 24 are generically shown to correspond with any communication medium suitable for transporting the various layers/streams and may be physically and/or logically distinct and comprised of some combination of wireless and/or wireline communication mediums. The scheduler 20 may include a plurality of interfaces 32, 34, 36 operable to facilitate communications with a corresponding link, optionally having capabilities associated with a signal processor, end station, eNodeB, base station, cable modem, Wi-Fi radio or other device having capabilities sufficient to facilitate the contemplated multi-link communications, including those suitable to facilitating Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein.

The transport of one or more layers 22 over one or more links 24 may require processing, addressing or other manipulations to be performed at the corresponding interface. The interfaces 32, 34, 36 may be configured to support device Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), etc., the disclosures of which are hereby incorporated by reference in their entireties. The interfaces 32, 34, 36 may optionally be configured to support a particular type of length, e.g. one of the interfaces may be an LTE interface and another one of interfaces may be a Wi-Fi interface or a DOCSIS interface. The controller 30 and/or the interfaces may be responsible for addressing messages and otherwise complying with transmission requirements of the particular network. One non-limiting aspect of the present invention contemplates packets used to transport the layers/frames to be addressed according to Internet Protocol (IP), optionally with all of the packets having the same source and destination addresses due to the packets emanating from the same transmitter 14 and being received at the same receiver 16 or device associated with the receiver 16.

FIG. 2 illustrates a flowchart 40 of a method for parallel scheduling of multilayered media in accordance with one non-limiting aspect of the present invention. Block 42 relates to determining multilayered media desired for transport, such as in response to a transmission request received from a network scheduler or user input sufficient for identifying the media desired for transport and a destination address/location. The multilayered media may comprise or consist of any type of media having multiple layers, streams, portions or other identifiable units susceptible or otherwise amenable to the multi-link transport contemplated herein, such as MPEG-2, MPEG-4, H.263+ and DCT based encoding schemes. The portions of the media amenable to multi-link transport are hereinafter referred to for exemplary non-limiting purposes as layers, which may be identified to a transmitter as a function of information included with the corresponding transport request. Some media desired for transport may include more layers than other types of media and/or some media may include layers that change over time, e.g., a layer a beginning of a particular type of media may not be present at an ending of the media. While not intending to limit the scope and contemplation of the present invention, the media may be a television program, movie, etc. formatted according to MPEG whereby the contemplated layers may be demarcated according to I-frames, B-frames, and P-frames.

Block 44 relates to determining links available for media transport. The links may be determined at a physical level, e.g., one link for Wi-Fi, one link for LTE and one link for DOCSIS, and/or the links may be determined at a logical or virtual level, e.g., one physical connection may support multiple links through virtual networks, tunnels, etc. The available links may also be determined as a function of operating characteristics, such as capacity, throughput, wireless spectrum, subscription rights and other variables tending to cause availability to be transient. The capacity or available capacity of a particular link may vary over time such that at one point in time the link is noted as being available while at another point in time the link may be noted as unavailable if overloaded. Similar determinations may be based on throughput or other operating characteristics, e.g., a physically available link may be determined to be logically or functionally unavailable if the throughput is below desired operating levels or licensing spectrum is temporarily unavailable. Optionally, the expected operating conditions over an expected length of the transport (e.g. movie run-time) may be analyzed to ensure the link remains available throughout a period of time needed to complete transport. In the event a link should become unavailable during transport, one of the other links may be engaged to make up for the deficiency.

Block 46 relates to demultiplexing the media desired for transport. The demultiplexing may include separating the media into a plurality of feeds associated with the different layers, e.g., the exemplary MPEG formatted video may be demultiplex into an I-Frame feed, a P-frame feed and a B-frame feed. The number of feeds or the amount of demultiplexing may correspond with the number of links selected to be available for transport. The demultiplexing may be skipped or delayed until a new link becomes available in the event a single link is determined or the demultiplexing may include generating a feed having multiple layers within it if the number of layers is greater than the available number of links (the I-frames and P-frames may be communicated over the same link as a single feed). The demultiplexing need not be stagnant throughout the corresponding transport and may be varied to more or less feeds/links as link operating characteristics change. The demultiplexing may include adding addressing information, timestamps or other data necessary to facilitate multiplexing the feeds back together at the receiver in a manner sufficient to enable desired playback. The multiplexing may also add delay, stuffing/blank frames and other data sufficient to synchronize the sequence of frames arriving at the receiver to compensate for transmission delays or inconsistencies attendant to the various links.

Block 48 relates to scheduling transport of the multilayered media. The scheduling may correspond with controlling the interfaces associated with each of the links selected for transport to communicate packets, signals or other segments depending on the operating characteristics of the corresponding link. The transport may be scheduled such that a received sequence of the frames following transport to the receiver is approximately equal to a multiplexed sequence of the frames when received at the demultiplexor, e.g., the media when received at the receivers is ordered in approximately the same order as when received at the demultiplexor. Optionally, the scheduler may facilitate transport of the media according to a transport sequence having delay, blanks, etc. added to compensate for transmission inequalities or latencies of the links. The transport sequence may differ from the multiplexed sequence by an amount or order sufficient for enabling the media to arrive at the receiver at the received sequence. The transport scheduling may also include facilitating the use of common source and destination addresses and/or notifying the receiver of various transmission related parameters necessary to facilitate the desired receipt and playback of the media.

As supported above, one non-limiting aspect of the present invention addresses issue of maximizing network user capacity by optimizing the delivery of multimedia to the maximum number of users, which may be is achieved by coupling a scheduling algorithm with the multilayer encoding supported by encoders such as MPEG4 to deliver the various layers over different links. In multilayer encoding, the source (video or audio) is encoded into multiple layers/streams and one aspect of the present invention takes advantage of the properties of the encoding layers (for example the I/P/B frames) to maximize capacity (number of users) of video delivery when the traffic in a network can be carried over two different technologies; for example: A hybrid of a wireless network and a HFC network, an HFC network running different versions of the DOCSIS specification (ex. D3.1 and D3.0, or D3.0 and D2.1, etc. . . . ) The network may be composed of two (or more) physical or logical networks as described above; the first network (Network A) has the highest reliability or most penetration to the largest number of users, and the second network (Network B) has either less reliability or penetration. This concept is not limited to two physical or logical networks, and can be extended to any number of networks.

To maximize capacity (number of users) of the video delivery, the I-frames may be scheduled for transport over the most reliable path or technology with most user penetration (Network A), P frames can be delivered over network A or B or a combination of both based on available capacity, and the B-frames over Network B. One example may related to a hybrid HFC/wireless network where the I-frames and P-frames may be delivered over the HFC network and the B-frames may be delivered over the wireless network based on capacity availability. In this situation, the HFC network traffic may be alleviated (from the B-frame loading) allowing other applications/data to use the path, the largest number of users will have the video delivered to them and the B-frames may be delivered opportunistically over the wireless network based on network loading such that video capacity is maximized (video delivered to largest number of users) and the HFC traffic may be alleviated allowing other applications to run. Another example may relate to a DOCSIS 3.1 and DOCSIS 3.0 networks where initial network deployments may have a more pervasive DOCSIS3.0 deployment and a gradually growing of D3.1 deployments. In this scenario, the I-frames and P-frames can be delivered over D3.0 and B frames can be delivered over D3.1 according to available capacity. Similar to above, this may guarantee that the maximum number of users are receiving the required video content, and based on available capacity or user tier rates, the B-frames can be delivered to the possible users to provide more resolution and video fidelity.

One non-limiting aspect of the present invention maximizes network capacity and utilization among subscribers while guaranteeing multimedia content delivery to the maximum number of users and allowing other applications/traffic to use and share the network. This may become even more crucial when video over IP becomes more prevalent. While delivery the multilayer encoded video/audio over the same network without differentiation is contemplated, this can create large network traffic and limit the ability of other applications to share the network. Timing work across multiple networks may be coordinated across corresponding schedulers/interfaces. The schedulers may be in the same transmitter and synchronization between the may be managed so that packets going on Link B do not arrive at destination beyond a certain timeframe compared to frames on link A, as doing so would cause them to be essentially useless and the scheduler is better off dropping the packets. The receiver may have knowledge that it is receiving packets from two different links, and thus possibly over two different IP addresses, and will be able to identify that the packets originate from the same source based on IP address/Port number. Given that the source of the frames are the same source (video source), there is no actual need to have multiple IP addresses given that they are originating from the same transmitter, IP address can be the same; as the goal of the IP address is to identify the source and the destination; but given that the links are different, the MAC addresses would be different. Several algorithms can be developed around the capabilities enabled with the present invention. The I-frame could be scheduled be on the network with most penetration or reliability or penetration x reliability to reach the largest number of users as it is a base frame. For the remainder of the frames, the scheduling can be based on latency, congestion, throughput, etc. and may depend on network operator needs and preferences.

One non-limiting aspect of the present invention contemplates an enhanced service delivery using Hybrid Wireless/Coax links. The customers (end users), may evaluate their link using two basic metrics: 1. Bits per second (speed); and 2. Quality (Video quality for streaming, downtime, etc. . . . ) For a certain deployment, in order to improve the above two metrics without a change to the underlying physical network, the one aspect of the present invention contemplates an evolution of the technology being transported on the links (e.g. DOCSIS 2.0, DOCSIS 3.0, DOCSIS 3.1, etc. . . . ), which may in some circumstances be unable to address the one constraint associated with the underlying network infrastructure, e.g., the coax part of their network. Another aspect of the present invention contemplates augmenting the coax network with wireless links to create a Hybrid RF/Coax network where the wireless and coax networks intelligently cooperate in delivering the data to the users whereby data is delivered using wireless and coax, rather than wireless or coax. Given that the coax and the wireless channels can be considered to be orthogonal channels, this may provide huge flexibility in optimizing service delivery to the end user. Per Shannon's equations, adopting this solution may provide an aggregate capacity greater than the sum of the capacities of both systems running independently.

The contemplated cooperation between the wireless and coax can occur at multiple layers:

1. Physical layer: The wireless can possibly provide opportunistically high throughput links but with higher susceptibility to channel conditions which impacts performance, while the coax links provide a higher availability and reliability but with possibly lower rates. Cooperation between the wireless and the Coax link can occur in multiple ways: a. By jointly optimizing the modulation and coding across both channels; and b. Interference/Noise management on the link by load shifting and thus improving SNR, the throughput/QoS can be enhanced to the end user.

2. MAC layer: Intelligent multi-link Scheduling, to decide on which link to schedule certain flows based on the QoS requirements and link loading.

3. Cross layer MAC-PHY optimization: as given in scenario 1; load balancing across both channels can yield improved signal quality across the channels by reducing the overall noise, or scheduling decisions based on PHY channel conditions and availability.

One physical layer scenario may include a deployment of N users who are being supported by the hybrid network where a subset M require a high US throughput while the N-M have a low US throughput requirement. By shifting the M-N users to the wireless links, the present invention can reduce the noise on the US Coax link due to noise funneling, which effectively increases the US SNR for the M users without impacting the N-M user experience. One MAC layer scenario may include a deployment of N users who are being supported by the hybrid network where a subset M require average throughput but low latency SLA, while the remaining users are requiring a high bursty throughput without stringent requirements for latency SLA (ex. Browsing, FTP downloads, etc. . . . ). The MAC can then decide to schedule the M users on the wireless links, thus protecting them from queuing delays that can arise from the other high throughput users. One cross-layer scenario may include video delivery over hybrid network using MPEG4 where a MAC scheduler can decide to schedule the I and P frames over the Coax link thus guaranteeing the delivery of the basic video frames, while deciding to schedule the B frames over the wireless link, which can provide the enhanced video quality if the link loading conditions allow.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions operable with a transmitter to facilitate scheduling subsequent transport of a plurality of layers when multiplexed in a multilayered media stream, the non-transitory instructions being sufficient for:
   demultiplexing the multilayered media stream to recover at least a first layer and a second layer of the plurality of layers;
   determining at least a first link and a second link available for transporting one or both of the first and second layers to a receiver;
   scheduling parallel transport of the first and second layers over the first and second links to the receiver, the parallel transport being sufficient for the receiver to multiplex the first and second layers to facilitate playback of the multilayered media stream, including adding synchronization data not demultiplexed from the multilayered media stream to at least one of the first and second layers when transported to the receiver to facilitate the receiver subsequently synchronizing multiplexing of the first and second layers; and
   adding the synchronization data to increase transmission time to the receiver for a corresponding one of the first and second layers such that the first and second layers arrive at the receiver in a received sequence approximately equal to a multiplexed sequence that the first and second layers were multiplexed in the multilayer media stream.

2. The non-transitory computer-readable medium of claim 1 further comprising non-transitory instructions sufficient for:
   determining reliability for the first and second links during a first time period such that one of the first and second links is determined as a higher reliability link and one of the first and second links is determined as a lower reliability link;
   determining priority for the first and second layers such that one of the first and second layers is determined as a higher priority layer and one of the first and second layers is determined as a lower priority layer;
   scheduling the parallel transport during the first time period such that the higher priority layer transports over the higher reliability link and the lower priority layer transports over the lower reliability link;
   determining data rates for the first and second links; and
   adding the synchronization data to a one of the first and second links having a faster one of the data rates.

3. The non-transitory computer-readable medium of claim 2 further comprising non-transitory instructions sufficient for:
   determining the first link to be the higher priority link and the second link to be the lower priority link during the first time period and the first layer to be the higher priority layer and the second layer to be the lower priority layer;
   determining reliability for the first and second links during a second time period following the first time period such that one of the first and second links is characterized as a higher reliability link and one of the first and second links is characterized as a lower reliability link;
   scheduling the parallel transport during the second time period such that the first layer transports over the first link and the second layer transports over the second link when the first link is determined to be the higher reliability link during the second time period; and
   scheduling the parallel transport during the second time period such that the first layer transports over the second link and the second layer transports over the first link when the first link is determined to be the lower reliability link during the second time period.

4. The non-transitory computer-readable medium of claim 1 further comprising non-transitory instructions sufficient for:
   determining capacity for the first and second links during a first time period such that one of the first and second links is determined as a higher capacity link and one of the first and second links is determined as a lower capacity link;
   determining priority for the first and second layers such that one of the first and second layers is determined as a higher priority layer and one of the first and second layers is determined as a lower priority layer; and
   scheduling the parallel transport during the first time period such that the higher priority layer and the synchronization data transports over the higher capacity link and the lower priority layer transports over the lower capacity link.

5. The non-transitory computer-readable medium of claim 1 further comprising non-transitory instructions sufficient for addressing the parallel transport according to Internet protocol (IP) addresses such that the at least one of the first and second layers transported over the first link has a source address and a destination address matching with a source address and a destination address of the one of the first and second layers transport over the second link.

6. The non-transitory computer-readable medium of claim 1 further comprising non-transitory instruction sufficient for:
   determining data transmission rates for each of the first and second links;
   determining an amount of the synchronization data to be added to the corresponding one of the first and second layers as a function of differences in the data transmission rates such that the amount is greater when the differences are greater and smaller when the differences are smaller;

generating the synchronization data as stuffing sufficient for increasing a total amount of data necessary to facilitate transport of the corresponding one of the first and second layers; and scheduling the parallel transport according to a transport sequence set for each of the first and second layers as a function of the data transmission rates, the transport sequence differing from the multiplexed and received sequence according to differences in the data transmission rates and the synchronization data so as to ensure the first and second layers arrive at the receiver in the received sequence.

7. A non-transitory computer-readable medium having a plurality of non-transitory instructions operable with a transmitter to facilitate scheduling subsequent transport of video frames when encoded in a Moving Picture Experts Group (MPEG) transport stream, the non-transitory instructions being sufficient for:

demultiplexing the MPEG transport stream to recover the video frames;

identifying each video frame as one of an intra-coded picture frame (I-frame), a predicted picture frame (P-frame) and bi-predictive picture frame (B-frame);

determining a plurality of links available for transporting the video frames from the transmitter to a receiver;

determining data transmission rates for each of the plurality of links;

determining a first sequence for the I-frames, P-frames and B-frames included in the MPEG transport stream when received at the transmitter; scheduling parallel transport of the video frames over the plurality of links such that each one of the plurality of links simultaneously transports some portion of at least one of the I-frames, P-frames and B-frames; and scheduling the parallel transport as a function of the data transmission rates to facilitate the I-frames, P-frames and B-frames arriving at the receiver in the first sequence, including adding at least some delay and/or stuffing/blank frames with the I-frames, P-frames and B-frames to correspondingly compensate for differences in the data transmission rates of the plurality of links.

8. The non-transitory computer-readable medium of claim 7 further comprising non-transitory instructions sufficient for scheduling the parallel transport such that the I-frames are transported over a most reliable one of the plurality of links.

9. The non-transitory computer-readable medium of claim 8 further comprising non-transitory instructions sufficient for scheduling the parallel transport such that the P-frames are transported over a second most reliable one of the plurality of links.

10. The non-transitory computer-readable medium of claim 9 further comprising non-transitory instructions sufficient for scheduling the parallel transport such that the B-frames are transported over a third most reliable one of the plurality of links.

11. The non-transitory computer-readable medium of claim 7 further comprising non-transitory instructions sufficient for scheduling the parallel transport such that the I-frames are transported over a one of the plurality of links having a greatest capacity and the B-frames are transported over a one of the plurality of links having a lowest capacity.

12. The non-transitory computer-readable medium of claim 11 further comprising non-transitory instruction sufficient for scheduling the parallel transport such that the P-frames are transported over the one of the plurality of links having the greatest capacity with the I-frames.

13. The non-transitory computer-readable medium of claim 7 further comprising non-transitory instruction sufficient for addressing packets carrying the I-frames, P-frames and B-frames over the plurality of links according to Internet protocol (IP) addressing such that each of the packets includes the same source and destination addresses.

14. The non-transitory computer-readable medium of claim 7 further comprising non-transitory instruction sufficient for:

determining operating characteristics of each of the plurality of links;

processing the operating characteristics to determine an amount of the delay and/or a quantity of the stuffing/blank frames to be added to each of the plurality of links in order for the frames transported therein to arrive at the receiver in the first sequence; and scheduling the parallel transport as a function of the operating characteristics determined for each of the plurality of links such that the one of the plurality of links having the greatest capacity or the greatest reliability as reflected in the determined operating characteristics is scheduled to transport the I-frames and at least another one of the plurality of links is scheduled to transport at least one of the P-frames and B-frames.

15. The non-transitory computer-readable medium of claim 7 further comprising non-transitory instructions sufficient for scheduling the parallel transport according to a second sequence determined as a function of the data transmission rates, the second sequence differing from the first sequence such that at least one of the I-frames, P-frames and B-frames is transmitted from the transmitter over one of the plurality of links in an order differing from an order specified in the first sequence.

16. A method for transporting video frames encoded in a transport stream comprising:

receiving the transport stream with an input of a transmitter;

demultiplexing the video frames included within the transport stream with a demultiplexor of the transmitter according to an encoding associated therewith; and scheduling transport of the video frames over both of a wireline interface of the transmitter configured to transport video frames over a wireline link and a wireless interface of the transmitter configured to transport video frames over a wireless link, including:

i) transporting the video frames over both of the wireline and wireless links in parallel;

ii) directing the video frames from the demultiplexor to a corresponding one of the wireline interface and the wireless interface depending on the encoding associated therewith; and iii) adding synchronization frames for transmission with the video frames to synchronize receipt of the parallel transported video frames at a receiver, the synchronization frames being stuffing/blank frames to be discarded or ignored by the receiver when received.

17. The method of claim 16 further comprising:

directing video frames encoded as intra-coded pictures (I-frames) to the wireline link and to directing video frames encoded as bi-predictive pictures (B-frames) to the wireless link;

determining transmission rates for the wireline and wireless links; and determining a quantity and a data size of the synchronization frames as function of the data rates so as to synchronize a sequence of the video frames when received at the receiver to match with an order of the video frames when demultiplexed with the demultiplexor.

18. The method of claim 16 wherein further comprising addressing packets used to transport the video frame over the wireless and wireline links according to Internet Protocol (IP), including addressing each packet to include the same source and destination address.

19. The method of claim 16 further comprising:
   determining operating characteristics of the wireless and wireline links; and
   scheduling addition of the synchronization frames and transport of the video frames as a function of the operating characteristics such that:
   i) the one of the wireless and wireline links having the greatest capacity or the greatest reliability as reflected in the determined operating characteristics is scheduled to transport video frames encoded as intra-coded pictures (I-frames) and the other one of the wireless and wireline links is scheduled to transport at least one of the video frames encoded as predicted pictures (P-frames) and bi-predictive pictures (B-frames);
   ii) a summation of the video and synchronization frames transported to the receiver exceeds a summation of the video frames demultiplexed with the demultiplexor; and
   iii) the video frames are transported to the receiver in an order different than an order of the video frames when demultiplexed with the demultiplexor.

* * * * *